United States Patent
Bran et al.

(10) Patent No.: US 10,260,003 B2
(45) Date of Patent: *Apr. 16, 2019

(54) MULTI-PURPOSE REACTOR AND PROCESS FOR THE PREPARATION OF MODIFIED BITUMEN

(71) Applicant: SHELL OIL COMPANY, Houston, TX (US)

(72) Inventors: Roberto Bran, Brisbane (AU); Cheluva Kumar, Bangalore (IN); Sachin Raj, Kuala Lumpur (MY); Daryl Scott, Brisbane (AU)

(73) Assignee: SHELL OIL COMPANY, Houston, TX (US)

( * ) Notice: Subject to any disclaimer, the term of this patent is extended or adjusted under 35 U.S.C. 154(b) by 181 days.

This patent is subject to a terminal disclaimer.

(21) Appl. No.: 14/877,321

(22) Filed: Oct. 7, 2015

(65) Prior Publication Data

US 2017/0101583 A1 Apr. 13, 2017

Related U.S. Application Data

(62) Division of application No. 13/519,778, filed as application No. PCT/EP2010/070859 on Dec. 29, 2010, now Pat. No. 9,200,205.

(30) Foreign Application Priority Data

Dec. 31, 2009 (WO) ................ PCT/IN2009/000759

(51) Int. Cl.
*C01C 3/02* (2006.01)
*C10C 3/04* (2006.01)
(Continued)

(52) U.S. Cl.
CPC ............ *C10C 3/04* (2013.01); *B01F 3/04588* (2013.01); *B01F 7/00633* (2013.01);
(Continued)

(58) Field of Classification Search
CPC .......... C10C 3/02; C10C 3/04; B01J 19/1812; B01J 2219/00765; B01J 2219/1943
See application file for complete search history.

(56) References Cited

U.S. PATENT DOCUMENTS

| 3,927,983 | A | 12/1975 | Gordon et al. |
| 3,935,093 | A | 1/1976 | Senolt et al. |

(Continued)

FOREIGN PATENT DOCUMENTS

| CN | 2417171 | 1/2001 |
| CN | 101010416 | 8/2007 |

(Continued)

OTHER PUBLICATIONS

Chemical Engineering; "High-Shear Mixing Don't Fall Victim to Common Misconceptions"; www.che.com; pp. 46-51; Apr. 2005.
(Continued)

*Primary Examiner* — Prem C Singh
*Assistant Examiner* — Brandi M Doyle

(57) ABSTRACT

A reactor is provided for the preparation of modified bitumen, which reactor comprises a horizontal housing comprising a cylindrical wall and two side walls, wherein a bitumen inlet has been provided at or near one of the side walls of the housing and a bitumen product outlet has been provided at or near the opposite side wall of the housing, wherein a plurality of inlets for the provision of oxygen-containing gas has been provided in the cylindrical wall of the housing between the bitumen inlet and the bitumen product outlet, which multi-purpose reactor is further provided with a mixer arranged inside the housing comprising at least one rotor rotating within at least one stator having a plurality of openings. The reaction is used to prepare modified bitumen by contacting bitumen in the reactor with a modified elevated temperature and pressure.

5 Claims, 2 Drawing Sheets

(51) Int. Cl.
  *B01F 7/00*   (2006.01)
  *B01F 7/04*   (2006.01)
  *B01F 15/00*  (2006.01)
  *B01F 3/04*   (2006.01)

(52) U.S. Cl.
  CPC ............ *B01F 7/00758* (2013.01); *B01F 7/04* (2013.01); *B01F 15/00883* (2013.01)

(56) References Cited

U.S. PATENT DOCUMENTS

| | | |
|---|---|---|
| 6,386,751 B1 | 5/2002 | Wootan et al. |
| 7,374,659 B1 | 5/2008 | Burris et al. |
| 2009/0312872 A1 | 12/2009 | Bums et al. |

FOREIGN PATENT DOCUMENTS

| | | |
|---|---|---|
| FR | 1327847 | 4/1963 |
| GB | 1244773 | 9/1971 |
| JP | 52-3394 | 1/1977 |
| JP | 2-115295 | 4/1990 |
| JP | 8-325577 | 12/1996 |
| JP | 4434239 | 1/2010 |
| SU | 1198094 | 12/1985 |
| WO | 1994006887 | 3/1994 |
| WO | 2006009474 | 1/2006 |
| WO | 2009152461 | 12/2009 |

OTHER PUBLICATIONS

PCT International Search Report dated Feb. 9, 2011 of PCT/EP2010/070859, filed Dec. 29, 2010.

MULTI-PURPOSE REACTOR AND PROCESS FOR THE PREPARATION OF MODIFIED BITUMEN

The present application is a divisional of U.S. application Ser. No. 13/519,778, filed Sep. 5, 2012, which is a 35 U.S.C. § 371 national stage filing of PCT/EP2010/070859 filed Dec. 29, 2010, which claims priority of Indian Application PCT/IN2009/000759 filed Dec. 31, 2009, the disclosures of which are incorporated herein by reference in their entirety.

The present invention relates to a multi-purpose reactor and a process for the preparation of modified bitumen, such as blown bitumen (including catalytically blown bitumen) or polymer modified bitumen or additive enhanced quality bitumen.

Bitumen is a viscous, non-volatile product from crude oil. It usually consists of hydrocarbons and derivatives which may be aromatic and/or have long carbon chains. It is commonly produced by refining processes after atmospheric or in vacuum fractionation. For raising the softening point of bitumen or when a bitumen having specific properties is to be produced the bitumen may be oxidized with an oxygen-containing gas to produce blown bitumen. The modification of the properties hazardous since volatile hydrocarbons may be released during the process and these hydrocarbons may accumulate in any air space within the bitumen blowing apparatus.

One such apparatus has been described in U.S. Pat. No. 3,935,093. This known apparatus comprises a vertical housing provided with a bitumen inlet at the bottom, agitating means at one or more positions in the housing and an air inlet in the lower portion of the housing. This air inlet debouches below the agitating means, such that air that is fed into the housing is in contact with the agitating means. Bitumen in the housing is moved around by the action of the agitating means and the air. A dispersion container has been arranged in the lower portion of the housing bitumen and serves to separate an upward bitumen flow from a downward bitumen flow. The downward bitumen flow can be discharged via a bitumen outlet at the bottom of the housing. The housing has further been provided with an air offtake at the upper part of the housing.

When such an apparatus is used the residence time of the bitumen may vary since both the inlet and the outlet for bitumen are provided at the bottom of the housing. Moreover, below the air offtake an air space may occur in which volatile hydrocarbons may accumulate so that hazardous situations may arise.

SU 1198094 describes an apparatus used for blowing bitumen which is a continuous stirred reactor that also functions as a gas-liquid separator. Bitumen enters the reactor at one end, and leaves at the other end, whilst gases are removed from the top of the reactor. This reactor has considerable gas space in which volatile hydrocarbons may accumulate. Additionally, the stirrers used to mix the bitumen and air is small when compared to the volume of the bitumen in the reactor. This means that a lengthy residence time is likely to be needed to ensure reaction of all the bitumen.

In order to overcome hazardous situations a tubular reactor has been proposed in WO 2006009474. In this reactor bitumen is passed along a tubular path, causing the bitumen to pass through a plurality of mixers in the tubular path. Air is injected through an air inlet at one point along the tubular path. So, the oxygen concentration is highest at the air inlet and gradually, along the tubular path, the oxygen gets depleted. Hence, the driving force for the reaction diminishes along the tubular path so that the reaction rate of the oxidation reaction is further reduced. Moreover, the tubular path involves a high pressure drop and thereby limits the throughput capacity of bitumen.

WO 2009152461 describes a method and system for manufacturing modified asphalts. An in-line high shear mixer is used to mix oxygen containing gas such as air with bitumen. Like in WO 2006009474 air is injected at one point. Moreover, the blown bitumen product and any remaining oxygen is re-circulated, in some embodiments more than 50 times, back to hot bitumen storage container 102. The amount of air fed back into the hot bitumen storage container may be such that it can be re-circulated to the in-line mixer (page 13, paragraph 0032). Moreover, below the air offtake in the hot bitumen storage container an air space may occur in which volatile hydrocarbons may accumulate so that hazardous situations may arise.

The present invention intends to overcome the deficiencies in the prior art apparatuses and processes. Accordingly, the present invention provides a reactor for the preparation of modified bitumen, which reactor comprises a horizontal housing comprising a cylindrical wall and two side walls, wherein a bitumen inlet has been provided at or near one of the side walls of the housing and a bitumen product outlet has been provided at or near the opposite side wall of the housing, wherein a plurality of inlets for the provision of oxygen-containing gas has been provided in the cylindrical wall of the housing between the bitumen inlet and the bitumen product outlet, which multi-purpose reactor is further provided with a mixer arranged inside the housing comprising at least one rotor rotating within at least one stator having a plurality of openings.

Figure 1:
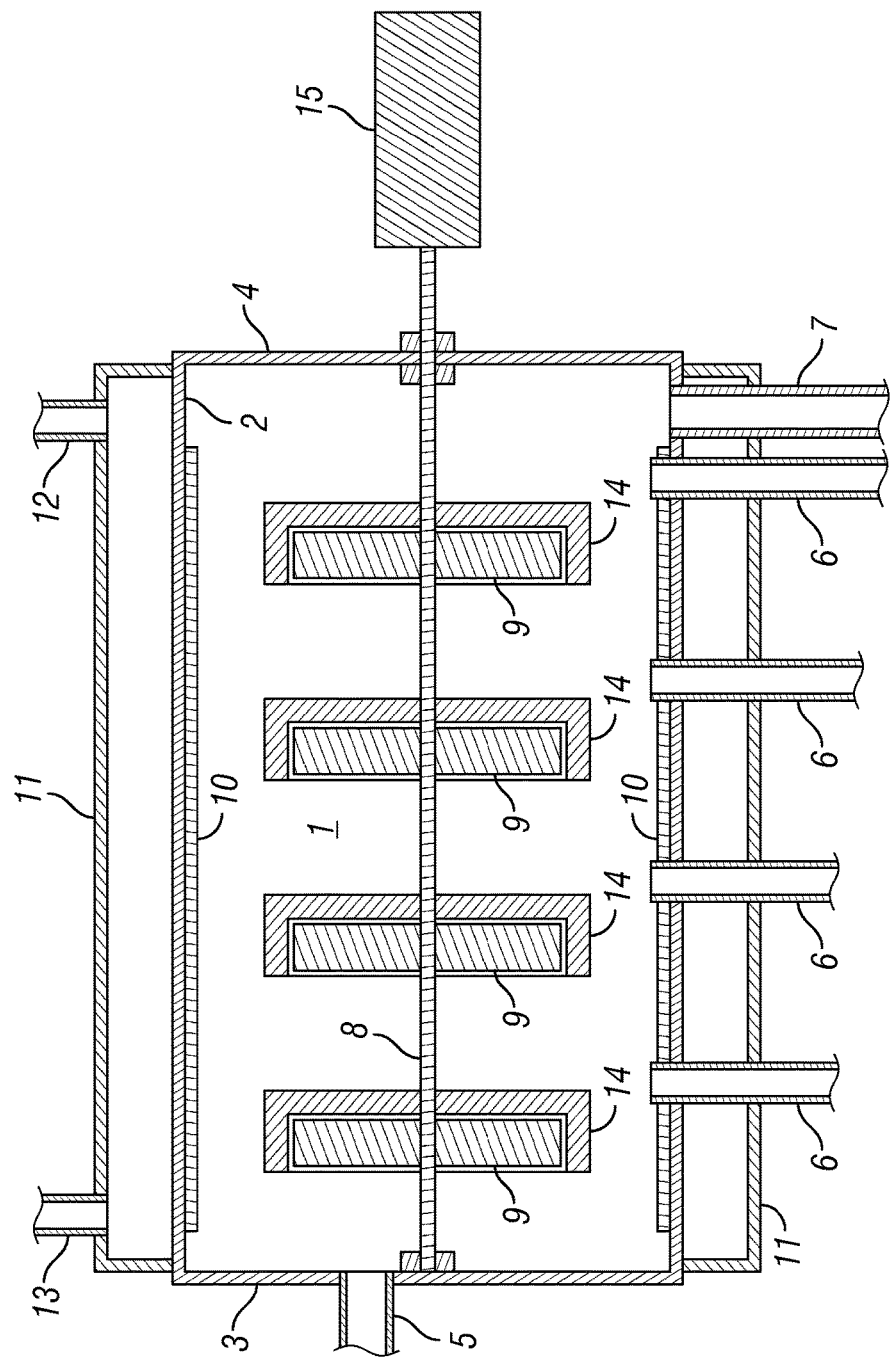
FIG. 1 is a schematic drawing of the reactor according an embodiment of the present invention.

The reactor of the invention ensures good mixing of bitumen and oxygen-containing gas at acceptable residence times and minimises the accumulation of volatile hydrocarbons. The reactor can also help to reduce complexity in bitumen manufacturing. Presently, only limited crude feedstocks can be used to produce bitumen that meets the specified grades. The reactor of the invention can be used with a wide range of crude feedstocks, thereby increasing flexibility. The reactor of the invention has efficient mixing and can typically be smaller than conventional units, thereby reducing costs.

A mixer comprising at least one rotor rotating within at least one stator having a plurality of openings is commonly referred to as a high shear mixer.

High shear mixers are used for a variety of applications, such as in the pharmaceutical industry, and in manufacture of paper, in particular in applications where it is necessary to produce a dispersion or emulsion of ingredients that do not naturally mix. In operation, the tip of the rotor turns faster than the centre of the rotor, creating shear. As the rotor rotates within a stator, this forms a high shear zone. The rotor and stator combined are often referred to as the mixing head or generator. High shear mixing has e.g. been described in Chemical Engineering, April 2005, pp. 46-51.

For the purpose of this specification, whenever hereinafter the term "high-shear mixer" is used, that is a short hand reference to a mixer comprising at least one rotor rotating within at least one stator having a plurality of openings.

According to a further aspect, the present invention provides use of the reactor as described herein for the purpose of modifying bitumen.

According to a further aspect, the present invention provides a process for the preparation of modified bitumen, which comprises contacting bitumen at elevated temperature and pressure with a modifier in a reactor as described herein.

A particularly advantageous feature of the reactor according to the present invention is that it is a multi-purpose reactor. Prior art processes for the modification of bitumen utilize different reactors for (i) modifying bitumen with an oxygen-containing gas, that is for preparing so-called blown bitumen, optionally in the presence of a catalyst, and (ii) for modifying bitumen with a polymer and/or additive.

The reactor according to the present invention can advantageously be used for preparing modified bitumen such as blown bitumen, polymer modified bitumen, additive enhanced bitumen and combinations thereof, such as multigrade bitumen.

According to one preferred embodiment the reactor of the present invention further comprises at least one inlet for the provision of catalyst and/or polymer and/or additives at or near the bitumen inlet or in the cylindrical wall of the housing.

According to another preferred embodiment, the bitumen inlet is used to provide catalyst and/or polymer and/or additives into the reactor. Typically, bitumen and catalyst and/or polymer and/or additive is premixed with bitumen, typically in a pre-mixing tank, and fed together with the bitumen into the reactor of the present invention.

Preferably, the reactor according to the present invention further comprises a system for heating at least part of the cylindrical wall of the housing arranged within or outside at least part of the cylindrical wall of the housing.

Preferably, the system for heating is a thermostatically controlling means, more preferably the thermostatically controlling means is a jacket for the circulation of a liquid medium or heat tracing.

Preferably, in the reactor according to the invention the plurality of inlets for oxygen-containing gas amounts to 3 to 10 inlets.

Preferably, in the reactor according to the invention the mixer comprises 3 to 6 rotors arranged on a single rotating shaft and each rotating within a stator having a plurality of openings.

Preferably, in the reactor according to the invention the housing is further provided with baffles running in a direction perpendicular to the side walls.

As outlined above, the present invention further provides a process for the preparation of modified bitumen. According to one preferred embodiment, the process comprises mixing bitumen at elevated temperature and pressure, more preferably a temperature of from 160 to 300° C., even more preferably 200 to 300° C., and more preferably at a pressure of from 2 to 4 bar absolute, with a modifier, wherein the modifier is an oxygen-containing gas that is provided via a plurality of inlets.

According to another preferred embodiment, the process for the preparation of modified bitumen involves mixing the bitumen with a modifier, wherein the modifier is a polymer or an additive and the reactor is equipped with a thermostatically controlling means. Preferably, bitumen and modifier are mixed in a pre-mix tank and the mixture is introduced in the reactor through the bitumen inlet.

Preferably, the process for the preparation of modified bitumen is carried out at a temperature of from 160 to 300° C., more preferably 200 to 300° C., and preferably at a pressure of from 2 to 4 bar absolute.

The reactor according to the invention allows for a high throughput and provides for a full flow of reactants, without allowing space for gas accumulation. The reactants may be passed through the reactor in mixed flow pattern created by the agitator. Further, for the production of blown bitumen, optionally in the presence of a catalyst, it allows for injection of oxygen-containing gas in a plurality of points to control the reaction speed. The high-shear mixer allows for creation of small bubbles of oxygen-containing gas, and breaking of blown bitumen layer surrounding bubbles of oxygen-containing gas. For the production of polymer modified bitumen or additive enhanced quality bitumen, the high-shear mixer ensures uniform distribution of polymer or additives respectively.

The reactor has been provided with a bitumen inlet and a bitumen product outlet at or near opposite side walls of the horizontal housing. It has been found that it is easier to completely fill the reactor with reactants and avoid air spaces where hydrocarbon gases may accumulate, when the inlet and outlet are present at the opposite side walls.

The reactor has a bitumen product outlet. The reactor preferably has no additional outlet for gaseous products; the gaseous products preferably leave the reactor via the bitumen product outlet. This is preferable to prior art systems wherein there is gas space above the bitumen in the reactor and a gas outlet for removal of gaseous products. By minimizing the gas space in the reactor, the present inventors have reduced the risk of accumulation of volatile hydrocarbons. Preferably less than 10 vol % of the reactor is gas space, more preferably less than 5 vol %, most preferably less than 1 vol %.

The housing of the reactor is arranged horizontally, that is the central axis of the cylindrical wall is in a substantially horizontal position, preferably not more than 10° from a horizontal position, more preferably not more than 5°, even more preferably not more than 2°. In this way air spaces are avoided where hydrocarbon gases and any remaining oxygen-containing gas may accumulate and present a safety risk.

One of the advantages of the present invention resides in the provision of a plurality of inlets for oxygen-containing gas. In this way the concentration of oxygen can be monitored and controlled to a desired level for the production of blown bitumen, optionally in the presence of a catalyst. The skilled person may determine the number of inlets depending on the size of the reactor, the throughput of bitumen and the desired oxygen level in the mixture of bitumen and oxygen-containing gas. However, it has been found that it is preferred to have from 3 to 10 inlets for oxygen-containing gas in the housing.

The oxygen-containing gas can be any gas that contains molecular oxygen. Hence, it may comprise substantially pure oxygen, oxygen-enriched air, air or even oxygen-depleted air. Also other combinations of oxygen and other, preferably inert, gases, such as nitrogen or carbon dioxide, are possible. However, it is most convenient and economical to use air as oxygen-containing gas.

The oxygen-containing gas is typically provided to the inlets for oxygen-containing gas at elevated temperature, typically in the range of from 30 to 300° C., preferably of from 150 or 160 to 300° C., more preferably from 200 to 300° C.

The mixer preferably comprises at least 2 rotors rotating within at least 2 stators. More preferably the mixer comprises at least 3 rotors rotating within at least 3 stators. Preferably, the mixer comprises at most 20 rotors rotating within at most 20 stators.

According to a particularly preferred embodiment, the mixer comprises a series of rotors rotating within a stator.

The number of rotors per series preferably ranges from 2 to 6. The number of stators preferably ranges from 2 to 20, more preferably 3 to 10.

Preferably, the rotor is an impeller.

The stator has a plurality of openings. The openings may be in any desired form or shape. According to one preferred embodiment, the stator is equipped with openings that are in the form of slots. Accordingly, preferably the stator is a slotted stator. Preferably at least one rotor/stator combination is capable of breaking down lumps of solids like polymer lumps upon introduction in the reactor.

The person skilled in the art may design the high-shear mixer in accordance with his desires. Key design factors include the diameter of the rotor and/or stator, the rotational speed, the distance between the rotor and the stator, the residence time of the bitumen in the housing, the number of rotor and stator combinations. As to rotor-stator combinations also the number of rows of teeth, their angle, and the width of the openings between the teeth may be varied.

Preferably, the high-shear mixer comprises multiple impellers and stators on a central rotating shaft. The central rotating shaft is preferably arranged parallel to the axis of the cylindrical wall, more preferably along the axis. More preferably, the high-shear mixer comprises a number of series of impellers and stators on a rotating shaft. The number of impellers preferably ranges from 2 to 6 impellers per series and from 3 to 10 series per housing. Preferably each series of impellers rotates within one stator.

In operation, the velocity profile differs between the bitumen at the outside diameter of the rotor on the one hand and the bitumen at the centre of the rotor or the shaft. Various manufacturers have developed high-shear mixers. Preferably, the mixing is conducted with impellers rotating at a speed of 1000 to 3500 rpm.

Preferably the diameter of the rotors is large when compared to the diameter of the horizontal housing, thereby ensuring uniform mixing of all the bitumen in the reactor. Preferably the ratio of the diameter of the rotors to the diameter of the horizontal housing is at least 1:2, more preferably at least 2:3.

It is advantageous that the bitumen is passed through the reactor at mixed flow conditions. The minor amendments in the composition by the injection of the oxygen-containing gas is assumed not to have any material effect on the mixed flow of the bitumen.

The reactor is preferably provided with one or more baffles running in a direction perpendicular to the side walls. The number of baffles may vary within relatively wide ranges. Suitably the number ranges from 2 to 20 baffles, more preferably from 3 to 6.

The reactor is suitable for use as reaction vessel for the blowing of bitumen, optionally in the presence of a catalyst, or the preparation of polymer modified bitumen or additive enhanced quality bitumen. Such reactions take usually place at elevated temperatures. For the production of normal or catalytically blown bitumen, the contact between bitumen and oxygen-containing gas is suitably conducted at a temperature of from 160 to 300° C. For the production of polymer modified bitumen or additive enhanced quality bitumen the reactor is preferably provided with jacketed heating or heat tracing with thermostatically controlling means. In this way the reaction rate may be kept at the desired level. One advantageous and relatively simple means to provide thermostatic control is a jacket for the circulation of a liquid medium. Such jacket is suitably surrounding the horizontal housing.

Due to the design of the reactor the reaction can be conducted at a wide range of reaction conditions. Such conditions include at a temperature of from 160 to 300° C. and at a pressure of from 2 to 4 bars absolute. The multi-purpose reactor and the process of the present invention are excellently suited for producing normal or catalytically blown bitumen or polymer modified bitumen or additive enhanced quality bitumen in a continuous manner.

The invention will be further illustrated by means of the following Figures.

FIG. 1 shows a schematic drawing of the reactor according to the present invention.

Figure 2:
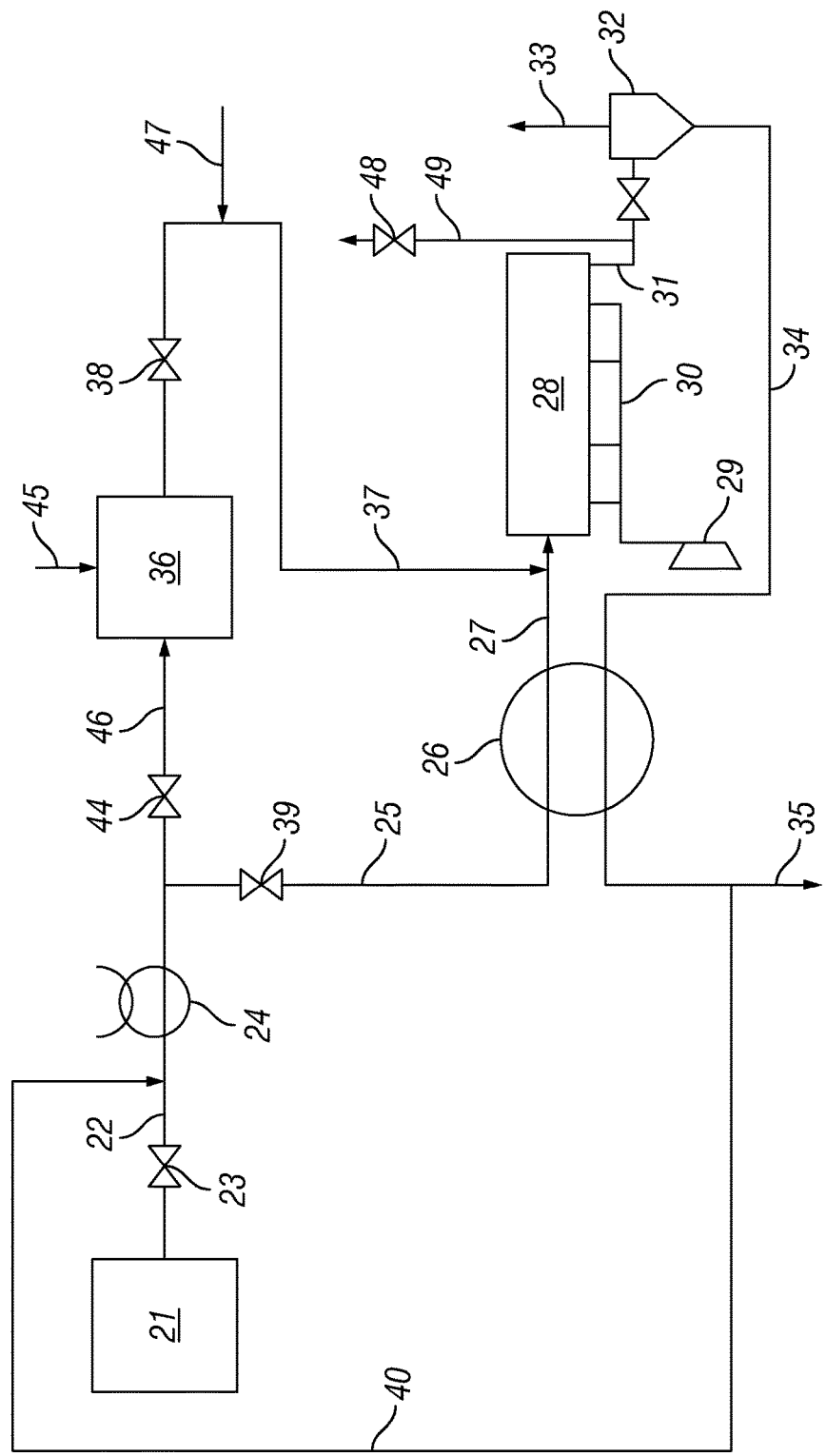
FIG. 2 is a flow schematic showing of a bitumen modification plant utilizing the reactor of the invention.

FIG. 2 shows a flow scheme of a plant wherein the reactor can conveniently be used but the skilled person will understand that this scheme can be applied as a stand-alone skid-mounted unit at depots where bitumen is stored, handled and distributed, outside a typical refining complex.

FIG. 1 shows a reactor 1 provided with a horizontal housing comprising a cylindrical wall 2 and side walls 3 and 4. Side wall 3 has been provided with a bitumen inlet 5 through which bitumen is passed into the housing. The cylindrical wall 2 has been provided with inlets 6 for the introduction of oxygen-containing gas, such as air. In the drawing four inlets 6 are shown, but the skilled person will understand that the number of inlets may vary. The cylindrical wall 2 has further been provided with a bitumen product outlet 7. Bitumen product outlet 7 has been arranged close to the side wall 4 in order to avoid the possibility of creating void spaces in the reactor 1. In axial direction the reactor 1 has been provided with a high-shear mixer which comprises a rotating shaft 8; a series of rotors, preferably impellers, 9; and stators 14. Each series of rotors consists in this embodiment of two rotors; preferably each series of impellers consists in this embodiment of two impellers. The shaft may be operated by means of an engine, e.g., an electrical engine, preferably a single variable speed driver 15. To avoid vortex formation in the reactor, the horizontal housing has been provided with baffles 10 running along the cylindrical wall 2, perpendicular to the side walls 3 and 4. In order to control the temperature in the housing the cylindrical wall 2 has been surrounded by a jacket 11 through which a liquid, such as a heated oil, may be circulated, which liquid is fed via a feed inlet 12 and withdrawn via a discharge 13.

FIG. 2 shows a flow scheme of a bitumen modification plant. A bitumen storage 21 provides bitumen via a line 22 when valve 23 is open. The bitumen in line 22 is preheated in a heat exchanger 24 typically using hot oil. It is evident that other heating equipment may be used alternatively. Heated bitumen is passed in line 25 via a heat exchanger 26, wherein the bitumen is heated further, to a reactor 28. Reactor 28 is a reactor according to the invention. The bitumen in the reactor 28 is contacted with air that is provided by a compressor 29 and a line 30 via a number of injection points. Bitumen product is discharged from the reactor 28 via a line 31. In a cyclone 32 the bitumen is separated from gases and volatile hydrocarbons. The skilled person will realise that other separation equipment may also be used instead of a cyclone, e.g. a gas-liquid separator may be used. These gases and hydrocarbons are withdrawn from the cyclone 32 via a line 33 for further handling. Suitably, these gases are sent to an incinerator (not shown). The blown bitumen is withdrawn from the cyclone 32 via a line 34. The line 34 is passed through the heat exchanger 26 in order to heat the bitumen to be treated. The final product, i.e., blown bitumen is recovered via a line 35. If desired, part of the blown bitumen may be passed via line 40 to line 22 for further treatment.

The plant also provides for the treatment of other bitumens. The reactor may be easily cleaned and subjected to a different grade of bitumen. As an example FIG. 2 shows a pre-mix tank 36 for a different bitumen grade, e.g., polymer-modified bitumen. Such bitumen comprises a polymer, suitably an optionally hydrogenated copolymer of an aromatic compound, such as styrene, and a conjugated diene, such as butadiene or isoprene. When valve 44 is open and valves 31 and 39 are closed, bitumen is fed via line 46 to pre-mix tank 36 and polymer is fed via line 45 to pre-mix tank 36. The mix of polymer and bitumen is fed via a line 37 and valve 38 to line 27 for further treatment in reactor 28. This provides flexibility to the bitumen plant making it a multi-purpose unit. It is also possible to add other additives such as wax, acid and other compounds to the bitumen by injecting such compounds into the bitumen to be treated, e.g., via pre-mixing tank and/or via line 47 to an injection point provided in line 37. The treated mix of polymer and bitumen is then sent to storage tank via line 49 and valve 48.

It is evident that FIG. 2 provides a schematic flow scheme, in which auxiliary equipment, such as pumps, valves, some compressors, expanders and control equipment, has not been shown. The skilled person will understand where this auxiliary equipment is desired.

That which is claimed is:

1. A process for the preparation of modified bitumen, which comprises mixing bitumen at elevated temperature and pressure with a modifier in a reactor comprising a horizontal housing comprising a cylindrical wall and two side walls, wherein a bitumen inlet has been provided at or near one of the side walls of the horizontal housing and a bitumen product outlet has been provided at or near the opposite side wall of the horizontal housing, wherein a plurality of inlets for the provision of oxygen-containing gas has been provided in the cylindrical wall of the horizontal housing between the bitumen inlet and the bitumen product outlet, and wherein said horizontal housing has no outlet for removing a gaseous product; and a mixer arranged inside the horizontal housing comprising at least one rotor rotating within at least one stator having a plurality of openings, and further wherein the modifier is a polymer or an additive and the reactor is equipped with a thermostatically controlling means.

2. A process for the preparation of modified bitumen as claimed in claim 1, wherein the modifier further comprises an oxygen-containing gas that is provided via a plurality of inlets.

3. A process according to claim 2, wherein the mixing of bitumen with oxygen-containing gas is carried out at a temperature of from 160 to 300° C. and at a pressure of from 2 to 4 bar absolute.

4. A process for the preparation of modified bitumen as claimed in claim 1, wherein bitumen and the polymer or additive modifier are mixed in a pre-mix tank and the mixture is introduced in the reactor through the bitumen inlet.

5. A process for the preparation of modified bitumen, which comprises mixing bitumen at elevated temperature and pressure with a modifier in a reactor comprising a horizontal housing comprising a cylindrical wall and two side walls, wherein a bitumen inlet has been provided at or near one of the side walls of the horizontal housing and a bitumen product outlet has been provided at or near the opposite side wall of the horizontal housing, wherein a plurality of inlets for the provision of oxygen-containing gas has been provided in the cylindrical wall of the horizontal housing between the bitumen inlet and the bitumen product outlet, and wherein said horizontal housing has no outlet for removing a gaseous product; and a mixer arranged inside the horizontal housing comprising at least one rotor rotating within at least one stator having a plurality of openings; and at least one inlet for the provision of catalyst and/or polymer and/or additives at or near the bitumen inlet or in the cylindrical wall of the housing, wherein the modifier is a polymer or an additive and the reactor is equipped with a thermostatically controlling means.

* * * * *